3,320,136
PROCESS FOR PREPARING A POLYSACCHARIDE
FLOCCULATING AGENT
James E. Zajic, Oklahoma City, Okla., assignor to Kerr-McGee Oil Industries, Inc., a corporation of Delaware
No Drawing. Filed May 19, 1964, Ser. No. 368,707
12 Claims. (Cl. 195—31)

This invention relates to a novel fermentation process for preparing a polysaccharide material useful as a flocculant, and to the resulting novel polysaccharide material. The invention further relates to a novel process for isolating desirable cultures of microorganisms having the capacity to synthesize the polysaccharide material of the invention.

Flocculating agents find use in a large number of applications in industry, such as in the flocculation of clay slimes from aqueous solutions resulting from the beneficiation of uranium, potash, aluminum and other ores by hydrometallurgical processes. A large number of natural and synthetic materials are used at present for this purpose. Examples of natural materials include agar, guar gum, glue and starch, while examples of synthetic materials include polyacrylamide, polymethacrylic acid and polyvinyl pyrrolidone.

Still other materials may be prepared or synthesized by certain microorganisms such as the dextran described in United States Patent No. 3,085,853 to Lesinski et al. However, the dextran described in the Lesinski et al. patent for use as a flocculating agent in the processing of bauxite ore has a very low flocculating activity and is usually considered to be unsatisfactory as a general flocculating agent for use in treating slime-containing hydrometallurgical leach liquors on a commercial scale.

The present invention provides for the first time an efficient process for synthesizing a polysaccharide material which is extremely active as a flocculant for a wide variety of finely divided solids suspended in aqueous media. The invention further provides a process whereby a highly desirable culture of microorganisms useful in the preparation of the flocculant of the invention may be readily isolated from mixtures of microorganisms, and especially mixtures of microorganisms derived from natural sources. Thus, the present invention overcomes the disadvantage of the prior art processes which prepare and utilize a flocculating agent synthesized by microorganisms.

It is an object of the present invention to provide a novel fermentation process for preparing a polysaccharide material which is especially useful as a flocculating agent.

It is a further object to provide the novel polysaccharide material prepared by the fermentation process of the invention.

It is still a further object to provide a novel process for isolating a culture of microorganisms useful in the preparation of the polysaccharide material of the invention.

Still other objects and advantages of the invention will be apparent to those skilled in the art upon reference to the following detailed description and the examples.

In accordance with one important variant of the invention, a novel process is provided for isolating desirable cultures of black yeast from mixtures of microorganisms containing the same. This variant of the invention is especially unusual and unexpected as it has been very difficult heretofore to isolate microorganisms which possess a desired biosynthetic capacity. The classical enrichment methods of isolating microorganisms normally yield microbes that are capable of adapting to and utilizing a specific substrate rather than an enriched or isolated culture of microbes which have specific biosynthetic capacities.

In accordance with the above variant of the invention, a mixture of microorganisms which includes the desired black yeast is cultivated in a special nutrient medium therefor that is substantially free of a carbohydrate utilized by the microorganisms. The mixture of microorganisms may be cultivated in the presence of at least one hydrocarbon that is utilized by the black yeast until the culture is selectively enriched in black yeast having the capacity to synthesize the polysaccharide flocculant material. During the cultivation of the microorganisms, or at least during the enrichment phase of the cultivation, it is preferred that the hydrocarbon be substantially the only readily available source of carbon present which is utilized by the microorganisms.

A number of suitable nutrient media in which the desired black yeast will grow readily and selectively may be utilized in the isolation of cultures of black yeasts in accordance with the present invention. An example of a preferred selective enrichment medium is as follows: 100 milliliters of water, 0.20 gram of sodium nitrate, 0.02 gram of magnesium sulfate, 0.10 gram of ferrous sulfate, 0.21 gram of dibasic potassium phosphate, 0.009 gram of monobasic potassium phosphate, 0.004 gram of sodium chloride, 0.0015 gram of calcium chloride, 0.5 microgram of copper sulfate, 1.0 microgram of boric acid, 1.0 microgram of manganous sulfate, 7.0 micrograms of zinc sulfate and 1.0 microgram of molybdic acid. The above solution may be adjusted in ph to about 7.0, 2.5% of agar added, and the mixture autoclaved to thereby provide a sterile solid nutrient medium. The resulting nutrient medium may be added to petri dishes, which are then used in solating and growing the cultures of black yeasts.

In isolating the cultures, a mixture of microorganisms containing the desired black yeasts may be plated out in the above prepared petri dishes containing the enrichment nutrient medium using standard plating procedures. The mixture of microbes is preferably obtained from natural sources, such as from soil and/or water. The petri dishes then may be incubated at a temperature suitable for growth of the microbes such as about 23–33° C., and preferably in gas tight containers provided with an atmosphere containing a normally gaseous hydrocarbon such as methane, ethane or natural gas. The atmosphere should also contain elemental oxygen, and the preferred atmosphere is a mixture of air and methane. Best results are obtained in most instances when approximately equal volumes of methane and elemental oxygen are present. The incubation is preferably conducted at about 30° C., and the incubation period may be from 7 to 14 days. During the incubation period, the only readily available source of carbon present for utilization by the microorganism is preferably the gaseous hydrocarbon in contact with the microorganism.

A wide variety of black yeasts may be isolated from natural sources following the above procedure. Out of a total of 955 microbial cultures isolated and purified in accordance with the present invention, more than 100 were identified as strains of *Pullalaria pullulans*, and still others were identified as yeast like forms of *Cladosporium herbarum* such as Monilia or *Torula nigra*. Black yeast cultures isolated in accordance with the invention may be used in preparing the novel polysaccharide flocculant materials in the process described hereinafter. For some reason or reasons unknown at the present time, the isolation and purification process described herein is capable of providing cultures of black yeasts which have unusually and unexpectedly high capacities for producing a unique polysaccharide material when cultivated in a fermentation medium in the presence of a carbohydrate. The resulting polysaccharide material has an exceptionally high activity as a flocculant for the flocculation of solids suspended in aqueous medium. Cultures of black yeasts obtained from the usual commercial sources do not synthesize a comparable polysaccharide material even when used in the novel fermentation process of the invention.

In accordance with still antoher variant of the invention, a polysaccharide flocculant material having exceptional activity as a flocculant is synthesized by cultivating black yeast in an aqueous fermentation medium therefor. When practicing the process of the invention, the fermentation medium must have an initial pH value of less than 6.0, and preferably an initial pH value of 2.0–6.0, and it must contain at least one substance utilized by the black yeast as a source of carbon such as a carbohydrate or hydrocarbon. Better results are obtained when the black yeast is cultivated in an aqueous fermentation medium having an initial pH value between about 3.0 and 5.3 as the resulting polysaccharide flocculant material has a higher activity. Optimum results are obtained when the fermentation medium has an initial pH value of about 5.2. In instances where the initial pH value of the fermentation medium is 6.0 or greater, the polysaccharide material does not have the desired degree of activity as a flocculant, and at initial pH values lower than about 2, the microbes usually are not sufficiently active to result in an economic process.

The microorganisms to be isolated in accordance with the present invention, as well as the microorganisms to be used in the fermentation process of the invention for preparing the polysaccharide flocculant material, are known generally in the art as "black yeasts." The black yeasts include microorganisms such as *Pullularia pullulans, Dematium chodati*, and forms of *Cladosporium herbarmum* such as Monilia or *Torula nigra*. As used in the present specification and claims, the term "black yeast" is intended to include microorganisms which are of the general type described above, and which have the capacity to synthesize a polysaccharide material having activity as a flocculant when cultivated in a fermentation medium therefor containing a carbohydrate or hydrocarbon utilized by the black yeast.

The fermentation medium for producing the polysaccharide flocculant may contain the usual substances which are known to be necessary in the growth and cultivation of black yeast, and including a source of carbon in the form of a carbohydrate or a hydrocarbon which is utilized by the microorganisms. For example, the fermentation medium may contain 100 milliliters of water, 0.5–15 grams of a carbohydrate, 0.5 gram of dibasic potassium phosphate, 0.1 gram of sodium chloride, 0.02 gram of magnesium sulfate, 0.06 gram of ammonium sulfate, 0.04 gram of yeast extract, and 0.05–2.0 milligrams of thiamine. The carbohydrate may be any suitable substance falling within this chemical classification that is readily utilized by the black yeast, including dextrose, sucrose, maltose, fructose, black strap molasses, cane syrup or sugar, beet sugar, wood sugars, or sugars derived by hydrolysis of wood, wood products, starch or starch products. Sucrose is usually the preferred carbohydrate for small scale fermentations as it is readily available and relatively low in cost, but less expensive materials such as black strap molasses may be more desirable for large scale fermentations. Examples of hydrocarbons which may be used include normally gaseous hydrocarbons such as methane, ethane and natural gas, of which methane is usually preferred. If desired, other salts may be substituted for the magnesium sulfate such as magnesium nitrate, magnesium chloride, magnesium borate, magnesium chloride and magnesium sulfate, or the chloride, nitrate, phosphate, sulfate, or fluoride of calcium. The optimal concentrations of each of these salts may be from 0.002 to 0.032 percent by weight of the fermentation medium. Ammonium compounds as a nitrogen source give excellent yields of mucoid polysaccharide material, but metal nitrates such as sodium or potassium nitrate are the preferred nitrogen source.

Laboratory scale fermentations may be conducted in 500 milliliter Erlenmeyer flasks and larger scale fermentations may be conducted in any suitable type or size of fermentation vessel. The fermentations are preferably conducted over a temperature range of about 15–40° C., and for best results at temperatures of about 20–35° C. Better results are usually obtained with aeration, and for this reason rotary shakers may be employed, or other means for agitating and/or aerating the fermentation medium. The fermentations are highly aerobic and the medium thickens due to the biosynthesis of the mucoid polysaccharide material, and thus it is advantageous to increase the rate of agitation or aeration as the fermentation proceeds.

Fermentation times for optimum results are unusually short and may range from about 36 hours to about 10 days. Upon termination of the fermentation, the mucoid polysaccharide material may be recovered and purified. Preferably, the fermentation broth is diluted with water, the pH is adjusted to about 3.5–7.5, and a water soluble alcohol such as methyl or ethyl alcohol is added in a quantity sufficient to precipitate the product substantially quantitatively. About equal volumes of water and about one to three volumes of alcohol have been found to be satisfactory, and a pH of about 5.5 gives optimum results. The resultant precipitate polysaccharide flocculant may be separated from the fermentation medium by filtration, centrifuging, and the like, and then dried. It may be further purified by dissolving in water and repeating the precipitation and drying steps. The dried product is stable and exhibits high flocculant activity for slimes suspended in aqueous media.

In instances where the impurities are not disadvantageous, the entire fermentation broth containing the unpurified polysaccharide flocculant may be used as a flocculating agent. This procedure is usually preferred in instances where slimes in hydrometallurgical leach liquors are to be flocculated.

The fermentations may be conducted by batch, semicontinuous or continuous processes. The fermentation is especially adaptable to continuous operation due to the high growth rate of the black yeast, the rapid conversion of substrate into high yields of product, and the relatively low levels of substrate which are necessary in order to achieve good yields. If desired, the carbohydrate or hydrocarbon substrate may be added to the fermentation medium gradually or in periodic increments. The extremely high growth rate for the cultures obtained in accordance with the isolation process of the invention is important as the resulting black yeast competes vigorously with contaminating microbes for the nutrients present in the fermentation medium and thereby decreases the likelihood of the fermentation being lost due to secondary contamination.

In flocculating finely divided solids suspended in aqueous media, such as clay slimes suspended in hydrometallurgical leach liquors, a small amount of either the fermentation medium containing the unpurified polysaccharide flocculant of the invention, or an aqueous solution of the purified polysaccharide flocculant, may be added to the aqueous medium. It is usually desired that very dilute solutions of the flocculating material be added, and that it be admixed with the aqueous medium containing the solids to be flocculated.

In instances where the fermentation must be carried out at a substantial distance from the place of use of the flocculant, the flocculant product may be precipitated as described above, filtered or centrifuged to remove excess water, and then dried by passing over drum driers. Spray drying or lyophilization may be used. Drying processes involving temperatures above 90° C. should be avoided as high temperatures often degrade the product. The dried product may be conveniently transported to the place of use and then dissolved in water and used as a flocculant.

It is not always necessary to adjust the initial pH value to 5.4 to obtain optimal yields of flocculant. It may be advantageous in some instances to start at a higher pH value and adjust the pH downward by addition of an acid, such as hydrochloric, sulfuric or other suitable mineral acid, to a more beneficial level in a range between about pH 2.5 and less than 6.0 at some selected time interval after inoculation of the fermentation medium. The time interval chosen for adjustment of pH is dependent upon the concentration of substrate and the total length of the fermentation. Where a 72 hour fermentation is being conducted with either 4.0% sucrose or dextrose added as a substrate, the pH should be adjusted to about 2.5 and less than 6.0 within about 60 hours of the inoculation.

It is possible to select a time interval after inoculation for pH adjustment which will produce a polysaccharide product having a flocculating activity approaching that observed under optimal pH conditions. Adjustment or control of the pH of the fermentation after inoculation at levels between 2.5 and less than 6.0 are extremely advantageous and, in some instances, the flocculation activity may even exceed that observed at selected optima. If an initial pH of about 6.0 or higher such as 6.0–8.0 is utilized and no attempt is made to control the pH within the desired limits, the flocculating activity of the polysaccharide product is decreased to impractical levels although there may be an increase in the amount of the polysaccharide like material which is synthesized. The material synthesized at the higher pH values differs substantially from the flocculant synthesized at a low pH in that it has a markedly lower specific flocculating activity.

Due to the unexpected lability of the flocculant product in the fermentation broth to enzymatic, hydrolytic, and thermal degradation, it is desirable to stabilize it after the fermentation is completed. Stabilization against enzymatic degradation may be effected by heating at about 50–100° C. until the enzymes are deactivated and yet not for a sufficient period of time to degrade the flocculant markedly. The period of heating at a given temperature may vary between a few seconds and about one hour. For better results, the final pH of the fermentation broth is adjusted to about 3–8 and then the broth is heated for a period of time. The optimum pH for storage is usually about 5.0 to 5.5, and the temperature of storage should be below 40° C. A good practical storage temperature in many instances is about 15–25° C., but often storage temperatures as low as freezing or below are very satisfactory. For some uses, the flocculant product may be exposed to temperatures up to 100° C. and the addition of caustic to adjust pH is essential in stabilizing the fluocculant activity.

Stability also may be improved by adding small amounts of formaldehyde to the broth after the fermentation is terminated, and preferably heating to an elevated temperature. The precipitated purified product of the invention also may be stabilized by dissolving it in water, adding formaldehyde and heating.

It is also possible to increase the stability by adding certain diluents. Dilution of the concentrated fermentation broth from 1:10 to 1:200 with water or saturated potash brine gives excellent storage properties. Storage in potash brine is very convenient and practical if the flocculant product is to be used in a hydrometallurgical process in which potash is being recovered.

The polysaccharide flocculant of the present invention has been found to be exceptionally active as a flocculant for slimes normally present in hydrometallurgical liquors derived from potash ores. Thus, the flocculation process of the present invention is especially useful in the processing of leach liquors derived by leaching Carlsbad potash ores.

The foregoing detailed description and the following specific examples are for purposes of illustration only, and are not intended as being limiting to the spirit or scope of the appended claims.

EXAMPLE I

This example illustrates the isolation of highly desirable cultures of black yeasts for use in the production of mucoid polysaccharide fluocculant material.

The nutrient medium used in this example contained the following ingredients: 100 milliliters of water, 0.20 gram of sodium nitrate, 0.02 gram of magnesium sulfate, 0.10 gram of ferrous sulfate, 0.21 gram of dibasic potassium phosphate, 0.009 gram of monobasic potassium phosphate, 0.004 gram of sodium chloride, 0.0015 gram of calcium chloride, 0.5 microgram of copper sulfate, 1.0 microgram of boric acid, 1.0 microgram of manganous sulfate, 7.0 micrograms of zinc sulfate and 1.0 microgram of molybdic acid. The pH of the nutrient medium was adjusted to 7.0, 2.5% agar was added, and the mixture was autoclaved for the purposes of sterilization. The resulting sterilized nutrient medium was then added to a series of petri dishes.

A one gram sample of soil which potentially contains black yeasts and a large number of other types of microbes was dispersed in water and portions thereof plated out in the petri dishes containing the nutrient medium using standard plating procedures. The petri dishes thus inoculated were incubated at 30° C. in gas tight containers containing a gaseous composition composed of 50% by volume air and 50% by volume methane. The incubation period was seven to fourteen days, and during the incubation period the only readily available source of carbon present for utilization of the microbes was the methane in the gaseous atmosphere.

A total of 955 microbial cultures were isolated and purified utilizing the above described enrichment process. Over 100 of these cultures were identified as strains of *Pullularia pullulans*, and others were identified as yeast like forms of *Cladosporium herbarum* such as Monilia or *Torula nigra*. The black yeast cultures thus obtained were used in the following examples.

Growth of cultures of black yeasts isolated and purified as described above in a sterilized fermentation medium having an initial pH of 3–5.5 and containing a carbohydrate utilized by the microorganism resulted in the surface formation of large quantities of mucoid polysaccharide material. The colonies were white at first, becoming cream colored, olive and then black as the cultures aged. Cultures synthesizing relatively low amounts of mucoid polysaccharide material had a dry, yeasty appearance, but those synthesizing relatively large amounts of a highly active polysaccharide fluocculant material appeared mucoid.

EXAMPLE II

This example illustrates the use of a culture of black yeasts isolated following the procedure of Example I in the preparation of mucoid polysaccharide flocculant material.

The fermentation medium used in this example contained the following ingredients: 100 milliliters of water, 5 grams of sucrose, 0.5 gram of dibasic potassium phosphate, 0.1 gram of sodium chloride, 0.02 gram of magnesium sulfate, 0.06 gram of ammonium sulfate, 0.04 gram of dried yeast extract and 1.0 milligram of thiamine.

The fermentation medium was sterilized and added in 100 milliliter portions to a series of 500 milliliter Erlenmeyer flasks, and each flask was then inoculated with a culture of black yeasts isolated following the procedure of Example I. The initial pH of the fermentation medium was about 5.2, and the flasks were incubated on a rotary shaker at 28° C. for three days. Growth of the black yeast culture in the fermentation medium was characterized by the surface formation of large quantities of mucoid polysaccharide material.

Small portions of unpurified fermentation medium containing the polysaccharide flocculant material were tested as a flocculant on portions of aqueous hydrometallurgical leach liquors containing suspended clays or slimes. The fermentation medium was found to have a very high flocculant activity for clays or slimes when added and admixed with the leach liquor.

The active polysaccharide flocculant material was isolated from a portion of the fermentation medium by adjusting the pH to 5.5, diluting with an equal volume of water, and then adding 2½ volumes of methanol or ethanol. Under these conditions, the active polysaccharide flocculant product precipitated quantitatively, and it was then filtered and dried. A sample of the resulting dried product was dissolved in water and the solution used as a flocculating agent for clays or slimes suspended in hydrometallurgical leach liquors. The dried product also showed a very high flocculant activity.

EXAMPLE III

This example illustrates the effect of varying the initial pH value of the fermentation medium on the activity of the resulting polysaccharide flocculant material as a flocculating agent.

The fermentations were conducted using the basic fermentation medium and general procedure of Example II unless otherwise noted. The active polysaccharide flocculant material was not isolated from the fermentation broth, and the entire fermentation broth was utilized as a flocculating agent. The fermentations were conducted using an inoculum in each instance derived from a single culture of black yeast isolated in accordance with Example I. The initial pH of the fermentation media varied between 3.0 and 10.0.

A suspension was prepared containing 1% by weight of finely divided slimes in saturated potash brine. The fermentation broths resulting from the fermentations at the various initial pH values were diluted with water to the same volume, and a portion of each was added dropwise with mixing to a 100 milliliter portion of the suspension of slimes in potash brine. The relative flocculating activity of the various fermentation broths was measured by determining the time required for the level of suspended solids to fall to the 50 milliliter mark from the 100 milliliter mark on a 100 milliliter graduated cylinder. The data thus obtained are recorded below in Table I.

TABLE I

| Initial pH of fermentation medium | Concentrated fermentation broth, ml. | Time required for liquid-solid interface of a 1.0% clay slime to fall from 100 to 50 ml. in a 100 ml. graduated cylinder. |
|---|---|---|
| 3.0 | 0.068 | 1′08″ |
| 3.5 | 0.068 | 56″ |
| 4.0 | 0.068 | 60″ |
| 4.5 | 0.068 | 1′16″ |
| 5.0 | 0.068 | 1′11″ |
| 5.5 | 0.068 | 2′13″ |
| 6.0 | 0.075 | 9′37″ |
| 6.5 | 0.075 | 11′55″ |
| 7.0 | 0.075 | 12′50″ |
| 7.5 | 0.090 | >60′ |
| 8.0 | 0.090 | >60′ |
| 8.5 | 0.090 | >60′ |
| 9.0 | 0.090 | >60′ |
| 9.5 | 0.090 | >60′ |
| 10.0 | 0.090 | >60′ |

It may be noted that very small amounts (0.068 milliliter) of the unpurified fermentation broth were effective in flocculating and settling solids in instances where the initial pH of the fermentation medium was less than 6.0. Fermentation broths prepared when the initial pH value of the fermentation medium was 6.0 and higher were generally unsatisfactory; however, broths prepared from fermentation media having an initial pH of 3.0 to 5.3 were especially effective as flocculants and are preferred.

EXAMPLE IV

This example illustrates the effect of varying the concentration of sucrose in the fermentation medium, and also the effect of varying the fermentation time between three and four days.

The fermentation medium and general procedure followed in Example II for preparation of the polysaccharide flocculant product were used in this example unless otherwise noted. The sucrose concentration in the fermentation medium was varied between 3 and 10%, and the fermentation time was either three days or four days. The fermentation broths were tested as flocculants for clay slimes using the slime suspension and the general procedure of Example III. The data thus obtained are recorded below in Table II.

TABLE II

| Percent by weight of sucrose in fermentation medium | ml. fermentation broth per 100 ml. 1.0% clay slime | Time required for liquid-solid interface to fall from 100 ml. to 50 ml. and fermentation time | |
|---|---|---|---|
| | | 3 days | 4 days |
| 3 | 0.125 | 18′15″ | 39′57″ |
| 4 | 0.125 | 4′02″ | 11′50″ |
| 5 | 0.125 | 2′05″ | 3′45″ |
| 6 | 0.125 | 3′31″ | 2′30″ |
| 7 | 0.125 | 1′47″ | 3′52″ |
| 8 | 0.125 | 2′36″ | 3′10″ |
| 9 | 0.125 | 2′11″ | 4′26″ |
| 10 | 0.125 | 4′40″ | 4′55″ |

From the above data, it may be seen that the invention is capable of producing a highly effective flocculant when using low concentrations of sucrose and fermentation times as low as three days. The presence of more than 7% by weight of sucrose in the fermentation medium did not result in an increase in yield. Using 5% or less sucrose is often advantageous because the conversion efficiency is high and the fermentation time is shorter. These factors result in an economical operation and especially if the fermentation is conducted in a semicontinuous or continuous manner.

In still other runs, it was found that as little as 0.5% by weight of sucrose in the fermentation medium gave good yields of the polysaccharide flocculant product. Fermentation times longer than four days often resulted in decreased yields of flocculant product and this indicated that the fermentation time should be carefully controlled and terminated prior to a decrease in yield.

EXAMPLE V

This example illustrates the manner in which the percent conversion of sucrose to flocculant varies with the initial concentration of sucrose in the fermentation medium.

From 1.0 to 10.0 grams of sucrose were present in a series of fermentation flasks containing 100 milliliter portions of the basic fermentation medium described in Example II. The initial pH of the resulting fermentation media was 5.2. The flasks were inoculated with identical quantities of an inoculum containing *Pullularia pullulans* and then incubated on a rotary shaker at a temperature of 28° C. for three days. The purified flocculant products were recovered from the fermentation media by adjusting the pH value of the fermentation broths to 5.5, diluting with an equal volume of water, and then adding 2½ volumes of methanol or ethanol. Under these conditions, the flocculant products precipitated quantitatively, and they were then dried and weighed. The following data were obtained:

TABLE III

| Grams sucrose per 100 ml. of fermentation medium | Flocculant recovered (g./100 ml. of broth) | Percent conversion of sucrose to flocculant |
|---|---|---|
| 1.0 | 0.76 | 76.0 |
| 2.0 | 1.38 | 69.0 |
| 3.0 | 1.96 | 65.4 |
| 4.0 | 2.15 | 53.5 |
| 5.0 | 2.35 | 47.1 |
| 6.0 | 2.35 | 39.1 |
| 7.0 | 2.44 | 34.9 |
| 8.0 | 2.43 | 30.4 |
| 9.0 | 2.55 | 28.4 |
| 10.0 | 2.78 | 27.8 |

The above data show that lower percentages of sucrose in the initial fermentation media result in higher conversions into the mucoid polysaccharide flocculant. This is of great benefit in a continuous operation as it is desirable to have low percentages of the substrate present.

EXAMPLE VI

This example illustrates the effect of varying the amount of inoculum added to the fermentation flask.

In determining the inoculum requirement for polysaccharide flocculant production in accordance with the invention, varying amounts of a 48-hour liquid culture of black yeast originally isolated according to Example I were used to inoculate fermentation flasks containing 100 milliliters of the fermentation medium used in Example II. The fermentation flasks were incubated for three days at 25° C. on a shaker rotating at 120 revolutions per minute. The product yield was determined by evaluating the flocculating activity of the unpurified fermentation broth following the general procedure described in Example III. The data thus obtained are recorded below in Table IV.

TABLE IV

| Percent by volume of inoculum | Ml. of fermentation broth | Time required for liquid-solid interface of a 1.0% clay slime to fall from 100 to 50 ml. in a 100 ml. graduated cylinder |
|---|---|---|
| 0.5 | 0.0375 | 2′03″ |
| 1.0 | 0.0375 | 2′24″ |
| 2.0 | 0.0375 | 2′32″ |
| 3.0 | 0.0375 | 2′29″ |
| 4.0 | 0.0375 | 2′47″ |
| 5.0 | 0.0375 | 3′03″ |

It may be seen from the above data that as little as 0.5% inoculum is very effective. The black yeast cultures obtained in accordance with the invention have high growth rates and are good competitors for nutrients and therefore there is a decreased likelihood of the fermentation being lost due to secondary contamination. Much less than 0.5% inoculum may be used if desired but longer fermentation times may be required.

The required minimum amount of inoculum often poses a critical problem in fermentation processes. Slow growing microbes with extended lag phases are easily contaminated and a higher population of cells must be present for optimum growth and product synthesis. Fermentation processes requiring 10% or more by volume of inoculum not only have higher ingredient costs, but require more accessory equipment. Therefore, it is apparent that cultures of black yeasts isolated in accordance with the present invention are highly useful in the economic production of the polysaccharide flocculant material.

EXAMPLE VII

This example illustrates a procedure for stabilizing the flocculating activity of the crude, unpurified fermentation broth.

In obtaining the data for Table V below, 0.1 milliliter of solutions containing various concentrations of sodium hydroxide was added to 5 milliliter portions of unpurified fermentation broth prepared in accordance with Example II. The same batch of fermentation broth was used in each instance.

After pH adjustment by addition of the sodium hydroxide solutions, the resulting mixtures were placed in a boiling water bath for 15 minutes. Then the flocculating activity for slimes was determined in each instance following the general procedure of Example III. A portion of the treated fermentation broth for each run was tested for flocculation activity immediately after heating, and an additional portion was stored for 24 hours at a temperature of 40° C. and then tested in an identical manner. The data thus obtained are recorded below in Table V.

TABLE V

| 0.1 ml. sodium hydroxide per 5.0 ml. flocculant | Boiling water bath, 15 min. | Time required for liquid-solid interface of a 1.0% clay slime to fall from 100 to 50 ml. in a 100 ml. graduated cylinder | |
|---|---|---|---|
| | | Not stored | 24 hours at 40° C. |
| 0.0 (Control) heated | + | 41′05″ | 58′25″ |
| 0.0 (Control) not heated | − | 34″ | 1′42″ |
| 1.0 normal | + | 5′32″ | 21′20″ |
| 2.0 normal | + | 3′10″ | 24′22″ |
| 3.0 normal | + | 2′56″ | 22′17″ |
| 4.0 normal | + | 26″ | 16′26″ |
| 5.0 normal | + | 11′24″ | 42′55″ |
| 6.0 normal | + | 34′00″ | 40′00″ |

The above data show that the original activity of the fermentation broth as a flocculant was maintained to a much greater extent in instances where sodium hydroxide solution was added before boiling. Storage of the unstabilized fermentation broth at 40° C. or higher resulted in a drastic decrease in the flocculating activity.

It was found that the stability also may be improved by adding small amounts of formaldehyde to the fermentation broth and then heating as above. Addition of certain diluents also have a favorable effect. Dilution of the concentrated fermentation broth from 1:10 to 1:200 with water or saturated potash brine gives excellent storage qualities. Storage in potash brine is very convenient in instances where the polysaccharide flocculant product is to be used as a flocculant in a hydrometallurgical process in which potash is being recovered. It has been found that storage at about 25° C. or lower assures the best retention of flocculating activity.

EXAMPLE VIII

This example demonstrates the beneficial effect of the downward adjustment of the pH after inoculation of the fermentation broth.

Twelve 100 ml. portions of fermentation broth were placed in six pairs of duplicate shake flasks and the initial pH values were adjusted respectively to 5.4, 5.6, 5.8, 6.0, 6.2 and 6.4. The flasks were sterilized, cooled, inoculated with *P. pullulans*, and fermented on rotary shakers at 28° C. as in Example V.

At the end of 48 hours, the flasks were removed and the pH values of the fermentation media were determined. One flask of each duplicate pair was selected for each initial pH level and the pH values were adjusted to 2.7 by addition of base. The flasks were returned to the rotary shakers and the fermentations allowed to continue until the total elapsed fermentation time was 72 hours. The fermentations were terminated and the crude undiluted fermentation broth in each flask was tested for flocculating activity following the general procedure of Example III. The results thus obtained are recorded below in Table VI.

TABLE VI

| Initial pH of fermentation broth | pH of fermentation broth adjusted to 2.7 at 48 hrs. | Total polysaccharide material recovered (g./100 ml. of fermentation broth) | Amount of flocculant added, ml. fermentation broth | Flocculation activity, time required to give 50% by volume sedimentation of clay suspension |
|---|---|---|---|---|
| *5.4 | + | 1.58 | .075 | 1'17" |
| 5.6 | − | 1.56 | .075 | 1'54" |
| 5.6 | + | 1.52 | .075 | 1'53" |
| 5.8 | − | 1.72 | .075 | 2'58" |
| 5.8 | + | 1.58 | .075 | 1'52" |
| 6.0 | − | 1.84 | .075 | 5'30" |
| 6.0 | + | 1.70 | .075 | 2'02" |
| 6.2 | − | 2.12 | .075 | 8'24" |
| 6.2 | + | 1.84 | .075 | 3'18" |
| 6.4 | − | 2.30 | .075 | 17'54" |
| 6.4 | + | 1.90 | .075 | 3'29" |

*pH of the system was at 2.7 at 48 hours after inoculation and it did not require adjustment.

It is apparent from the data of Table VI that somewhat higher yields of polysaccharide were obtained in systems in which the initial pH value was between 6.0 and 6.4 and in which no adjustment was made to pH 2.7 at the end of 48 hours. Corresponding flasks in which the pH was adjusted to 2.7 showed decreases in polysaccharide synthesis.

Although the amount of polysaccharide recovered is important, it is the flocculating activity per unit volume which must be used for evaluation. This comparison showed that fermentations starting at a pH value of 5.4 and ending at a pH value of 2.7 gave the highest flocculating activity. At higher pH levels, there was a corresponding decrease in flocculating activity which may be overcome to a large extent by adjusting the pH value to 2.7 at 48 hours.

What I claim is:

1. A process for preparing a polysaccharide comprising cultivating black yeast in an aqueous fermentation medium therefor, the fermentation medium having an initial pH value between 2 and less than 6.0 and containing at least one substance selected from the group consisting of carbohydrates and normally gaseous hydrocarbons utilized by the black yeast as a source of carbon, the black yeast and including at least one microorganism selected from the group consisting of *Pullularia pullulans*, *Dematium chodati*, and *Cladosporium herbarum* having the capacity to synthesize a polysaccharide material having activity as a flocculant when cultivated in the said fermentation medium and being cultivated therein until a polysaccharide flocculant material is produced.

2. The process of claim 1 wherein the polysaccharide flocculant material is precipitated from the fermentation medium by addition thereto of a water soluble alcohol, and the precipitated polysaccharide flocculant material is recovered from the fermentation medium.

3. The process of claim 1 wherein the black yeast was derived from the culture isolated by cultivating a mixture of microorganisms in a nutrient medium therefor, the mixture of microorganisms including black yeast having the capacity to synthesize polysaccharide flocculant material, the nutrient medium being free of a substantial amount of a carbohydrate which is utilized by the microorganisms, and the mixture of microorganisms being cultivated in the nutrient medium in the presence of at least one normally gaseous hydrocarbon utilized by the black yeast until the resulting culture is selectively enriched in black yeast having the capacity to synthesize polysaccharide flocculant material.

4. The process of claim 1 wherein the pH of the fermentation medium is about 3.0–5.3 and the black yeast is cultivated in the fermentation medium at a temperature of about 15–40° C.

5. A process for preparing a flocculant comprising cultivating black yeast in an aqueous fermentation medium therefor, the fermentation medium having an initial pH value between about 2 and less than 6.0 and containing a carbohydrate utilized by the black yeast, the black yeast including at least one microoganism selected from the group consisting of *Pullularia pullulans*, *Dematium chodati* and *Cladosporium herbarum* having the capacity to synthesize mucoid polysaccharide flocculant material when cultivated in the said fermentation medium and being cultivated therein until the mucoid polysaccharide flocculant material is produced.

6. The process of claim 5 wherein the pH of the fermentation medium is about 30–5.3 and the black yeast is cultivated in the fermentation medium at a temperature of about 15–40° C.

7. The process of claim 6 wherein the black yeast was derived from a culture isolated by cultivating a mixture of microorganisms obtained from a natural source in a nutrient medium therefore, the mixture of microorganisms including black yeast having the capacity to synthesize polysaccharide flocculant material and the nutrient medium being free of a substantial amount of a carbohydrate which is utilized by the microorganisms, the mixture of microorganisms being cultivated in the nutrient medium while the nutrient medium is in contact with a gaseous medium containing elemental oxygen and at least one normally gaseous hydrocarbon utilized by the black yeast until the resulting culture is selectively enriched in black yeast having the capacity to synthesize polysaccharide fluocculant material, the gaseous medium containing methane and the hydrocarbon in the gaseous medium being the only readily available source of carbon present in an organic compound which is utilized by the microorganisms.

8. A process for preparing a polysaccharide comprising cultivating black yeast in an aqueous fermentation medium therefor, the fermentation medium being inoculated with the black yeast while at an initial pH value of at least 6.0 and containing at least one substance selected from the group consisting of carbohydrates and normally gaseous hydrocarbons utilized by the black yeast as a source of carbon, the black yeast including at least one microorganism selected from the group consisting of *Pullularia pullulans*, *Dematium chodati* and *Cladosporium herbarum* having the capacity to synthesize a polysaccharide material having acitivity of a flocculant when cultivated in the said fermentation medium and being cultivated therein until a polysaccharide material is produced, thereafter adjusting the pH value of the fermentation medium to a lower pH value by addition of an acid, the pH being adjusted to a value between about 2.5 and less than 6.0 within about 60 hours of the initial inoculation, and then continuing cultivating the black yeast in the fermentation medium after adjusting the pH value until a polysaccaharide flocculant material is produced, the fermentation medium containing an enzyme produced by the black yeast.

9. The process of claim 8 wherein the fermentation medium containing the final polysaccharide flocculant material is heated at about 50–100° C. until the enzyme is deactivated.

10. The process of claim 9 wherein the final pH of the fermentation medium is less than 3, and the pH is adjusted to a value of about 3–5 by addition of base prior to heating to deactivate the enzyme.

11. A process for preparing a polysaccharide comprising cultivating black yeast in an aqueous fermentation medium therefor, the fermentation medium having an initial pH value between 2 and less than 6.0 and containing at least one substance selected from the group consisting of carbohydrates and normally gaseous hydrocarbons utilized by the black yeast as a source of carbon, the black yeast including at least one microorganism selected from the group consisting of *Pullularia pullulans*, *Dematium chodati* and *Cladosporium herbarum* having the capacity to synthesize a polysaccaharide material having activity as a flocculant when cultivated in the said fermentation medium and being cultivated therein until a polysaccharide flocculant material is produced, and then heating the fermentation medium containing the polysaccharide flocculant material at about 50–100° C. until the enzyme is deactivated, the fermentation medium containing an enzyme produced by the black yeast.

12. The process of claim 11 wherein the final pH of the fermentation medium is less than 3, and the pH is adjusted to a value of about 3–5 by addition of base prior to heating to deactivate the enzyme.

References Cited by the Examiner

Bender et al., Biochemica et Biophysica Acta vol. 36, pages 309–316 (1959).

Cook, The Chemistry anrd Biology of Yeasts, Academic Press Inc., New York, pages 20 and 604 (1958).

Ingram, An Introduction to the Biology of Yeasts, Pitman Publishing Corp., New York, (1955) pages 230 and Plate XII.

Skinner et al., Henrici's Molds, Yeasts and Actinomycetes, John Wiley and Sons Inc., New York, pages 110 to 113.

Zobell, Advances in Enzymology, vol. 10, pages 444–449 (1950).

A. LOUIS MONACELL, *Primary Examiner.*

ALVIN E. TANENHOLTZ, *Examiner.*